May 30, 1961 G. MARKIN 2,986,177
WOOD TURNING CUTTING TOOL
Filed Dec. 19, 1958 2 Sheets-Sheet 1
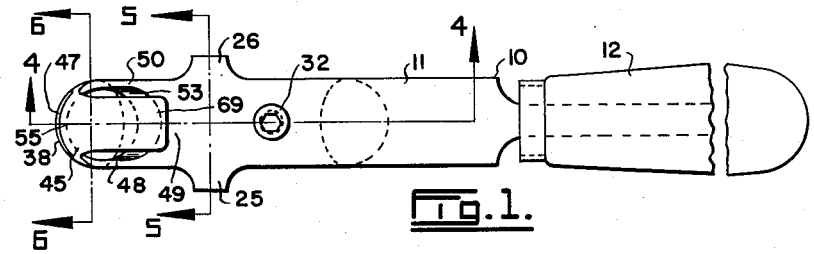
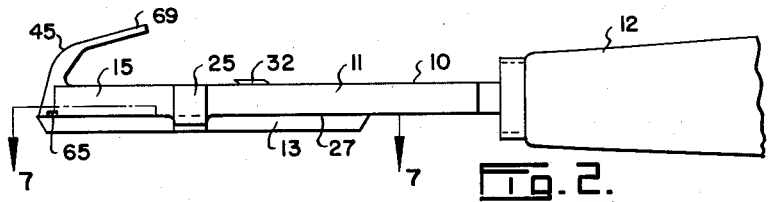
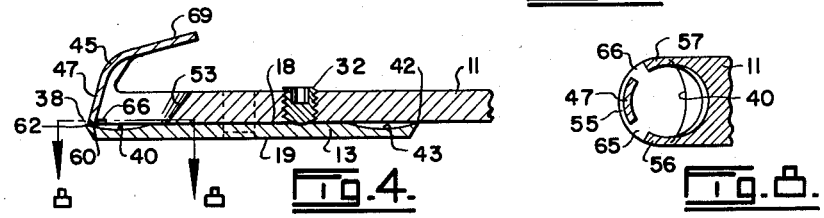
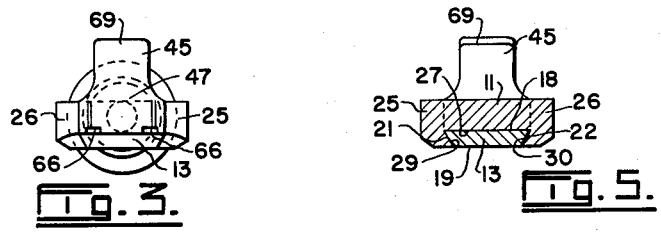
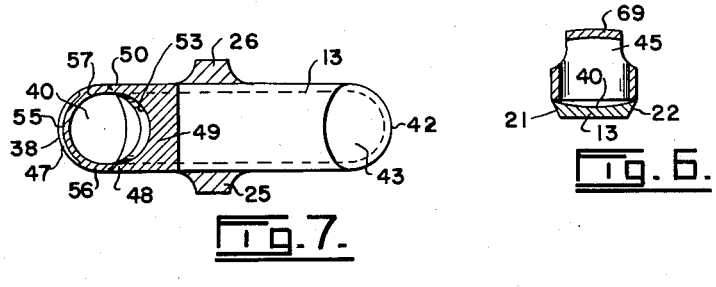
INVENTOR.
GEORGE MARKIN
BY
Fetherstonhaugh & Co.
ATTORNEYS May 30, 1961  G. MARKIN  2,986,177
WOOD TURNING CUTTING TOOL
Filed Dec. 19, 1958  2 Sheets-Sheet 2
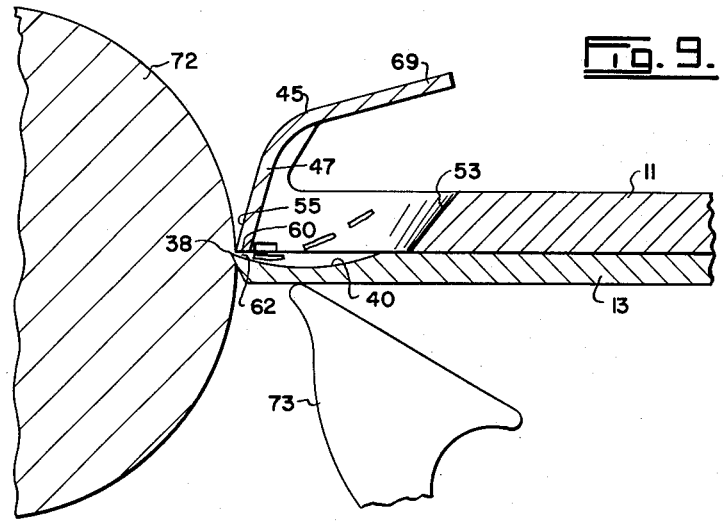
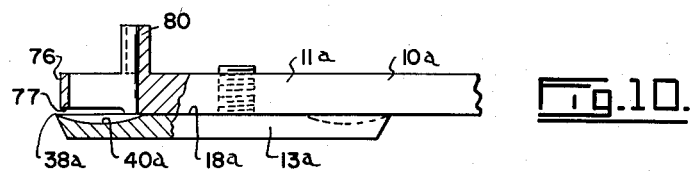
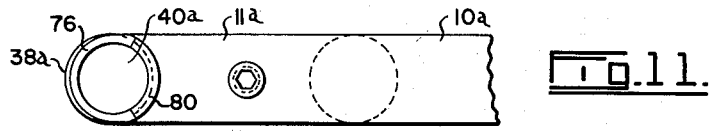
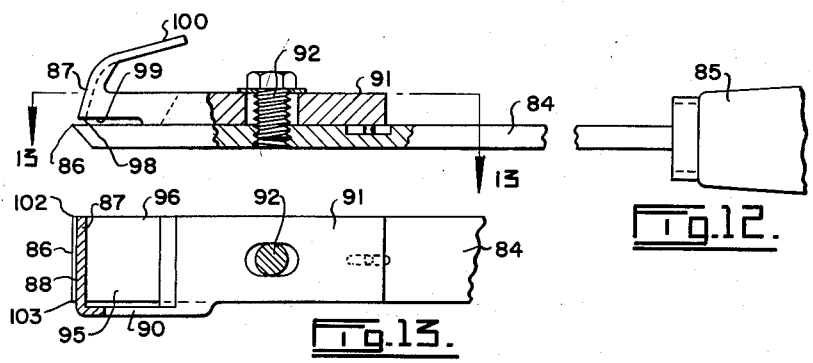
INVENTOR
GEORGE MARKIN
BY
Fetherstonhaugh & Co.
ATTORNEYS

United States Patent Office 2,986,177
Patented May 30, 1961

2,986,177

WOOD TURNING CUTTING TOOL

George Markin, P.O. Box 523, Grand Forks,
British Columbia, Canada

Filed Dec. 19, 1958, Ser. No. 781,666

4 Claims. (Cl. 142—56)

This invention relates to improvements in cutting tools used in making wooden articles in lathes.

An object of the present invention is the provision of a wood cutting tool having guard means for preventing the cutting edge of the tool from digging into the wood surface when it is used during a lathe turning operation.

Another object is the provision of a wood turning cutting tool having shield means for preventing wood particles from falling back on the cutting edge during operation to interfere with the cutting action.

The present invention is particularly applicable to wood turning gouges, but it may also be applied to lathe chisels. For the sake of convenience, the invention will be described mainly in connection with gouges.

As is well known, a lathe cutting tool, such as a gouge or chisel, rests during use on a tool rest positioned near the surface of the article being worked on. The tool extends towards the article surface, and said surface moves past the cutting edge of the tool at a fair speed. There is a tendency for the tool to dig into the wood unless considerable skill and care are exercised. If the tool is moved inwardly too far relative to the wood, or is held at a wrong angle, or engages a hard spot in the wood, the tool often digs in, spoiling the surface which is being subjected to the cutting action. If this happens when the article is near completion, it often ruins the article.

A lathe cutting tool according to the present invention is provided with a guard so located relative to the cutting edge of the tool that it engages the surface of the article being worked on to prevent the cutting edge from digging into said surface. The guard is so located that wood particles or shavings cut from the article pass beneath it away from the latter.

A wood turning cutting tool made in accordance with this invention comprises a blade, a cutting edge across an end of the blade, a guard connected to the blade corresponding in shape transversely of the blade to said cutting edge and spaced a little behind the latter inwardly of the blade, said guard being so positioned relative to the cutting edge that as the blade extends towards a surface of an article being worked on with the tool, the guard engages said surface to prevent the cutting edge from digging into the latter.

Examples of this invention are illustrated in the accompanying drawings, in which, Figure 1 is a plan view of a preferred form of wood turning cutting tool, Figure 2 is a side elevation of the tool, Figure 3 is an elevation of the cutting end of the tool, Figure 4 is a sectional view taken on the line 4—4 of Figure 1, Figure 5 is a cross section taken on the line 5—5 of Figure 1, Figure 6 is another cross section taken on the line 6—6 of Figure 1, Figure 7 is a horizontal section taken on the line 7—7 of Figure 4, Figure 8 is a fragmentary horizontal section taken on the line 8—8 of Figure 4, Figure 9 is an enlarged longitudinal section through the cutting end of the tool, illustrating the cutting action thereof, Figure 10 is a side elevation of an alternative form of cutting tool, Figure 11 is a plan view of the tool of Figure 10, Figure 12 is a side elevation of still another alternative form of tool, and Figure 13 is a plan view of the tool of Figure 12.

Referring to Figures 1 to 9 of the drawings, 10 is a wood turning cutting tool in the form of a gouge. This tool includes a shank 11 which is preferably flat and elongated as shown, and has a handle 12 connected to one end thereof in any convenient manner. A blade 13 overlaps the opposite end 15 of the shank and is connected thereto. Actually, the blade may be formed with or permanently connected to the shank, but the invention is improved if it is removably and adjustably connected thereto.

Blade 13 is preferably elongated and flat, as shown in Figures 2, 4 and 7. The blade has flat inner and outer surfaces 18 and 19, and bevelled side edges 21 and 22. These bevelled edges are such that outer surface 19 is narrower than inner surface 18, see Figure 5. In this example, shank 11 is formed with laterally-extending projections 25 and 26 that extend below the inner surface 27 of the shank. Inner bevelled shoulders 29 and 30 are formed on projections 25 and 26 and are so positioned and shaped that blade 13 slidably fits therebetween. These shoulders retain the inner surface 18 of the blade against the inner surface 27 of the shank. Suitable means is provided for adjustably retaining the blade in position on the shank. This may be accomplished by means of a set screw 32 threaded through the shank and bearing against the inner surface of the blade. When the set screw is screwed into the shank, its inner end presses against the blade to cause it to bind against shoulders 29 and 30, thereby fixing the blade relative to the shank.

Blade 13 has a cutting edge 38 extending across an end thereof. The shape of this edge across the blade depends upon the type of the tool as tool 10 is a gouge, cutting edge 38 is curved transversely of the blade. Furthermore, with this type of tool, the blade is preferably formed with a concave depression 40 in its inner surface 18 at the cutting edge 38. In this example, the depression actually helps to form the cutting edge as clearly shown in Figure 4.

The illustrated blade 13 is formed at its opposite end with another cutting edge 42 with a depression 43 immediately behind it, this cutting edge being shaped the same as edge 38. With this arrangement, the blade may be reversed so that cutting edge 42 may be used when desired. However, it will be understood that the second cutting edge and depression may be omitted.

A guard 45 is connected to blade 13 and corresponds in shape transversely of the blade to cutting edge 38. In tool 10, the guard is connected directly to shank 11 and through the latter to blade 13.

Guard 45 is in the form of a band 47 which is connected at one end 48 to end 49 of the shank. This band extends outwardly from the shank end and is curved across the shank and blade immediately behind cutting edge 38, and its opposite end 50 is connected to shank 49, see Figures 1 and 7. The guard band 47 is actually part of shank 11 and forms an opening 53 therein behind the guard and cutting edge 38 of blade 13. By referring to Figures 1 and 7, it will be seen that the outer surface 55 of guard band 47 is set back a little from the cutting edge 38, while the portions 56 and 57 of the band actually lie over the ends of said cutting edge. The inner edge 60 of band 47 is spaced from the adjacent surface of blade 13 which, in this case, is the bottom of depression 40, to form a passage 62 therebetween and behind cutting edge 38. Guard 45, and particularly its outer surface 55, extends outwardly away from blade 13 immediately behind the cutting edge thereof. It has been found advantageous to incline surface 55 outwardly and back from cutting edge 38, as clearly shown in Figure 4. Furthermore, it is desirable to form notches 65 and 66 in the lower edge of band 47 near the opposite ends of the cutting edge.

A shield 69 is connected to the outer edge of guard band 47 and extends rearwardly over shank opening 53 spaced outwardly therefrom.

When it is desired to use tool 10, blade 13 is adjusted relative to shank 11 to position cutting edge 38 properly in relation to guard 45. Screw 32 is tightened fixedly to secure the blade to the shank.

Figure 9 illustrates tool 10 in use on a wooden article 72 mounted in a lathe. The tool is placed on a tool rest 73 of the lathe with its cutting edge 38 in engagement with the surface of the article. It is preferable to so hold the tool that its guard 45 bears against the article surface. As the article turns, the cutting edge removes wood particles therefrom which travel through passage 62 under the guard band and into and through shank opening 53. Shield 69 prevents shavings from curling over the outer edge of the guard band or wood particles from jumping over said edge to block the view of the operator and/or to get down to the cutting edge to interfere with the cutting operation. The shield also prevents particles from flying towards the eyes of the operator. The guard prevents the cutting edge of the tool from being moved too far into the wood, and if there is any tendency for said cutting edge to bite deeper into the wood, it is moved downwardly so that the guard levers it out of the article. In other words, the guard prevents the cutting edge from digging into the wood under any circumstances. There is a tendency for shavings to slide back along the bottom of depression 40 and to wedge at the ends of passage or opening 62, but notches 65 and 66 prevent this wedging action so that any such shavings are cleared out by new shavings moving through the passage. The portions 56 and 57 of band 47 limit the effective cutting edge of the blade by covering the ends of said edge. This ensures the shavings and particles being able to fly away from the guard without obstruction.

Figures 10 and 11 illustrate an alternative form of the invention. The tool 10a of these figures has a blade 13a adjustably mounted thereon with a curved cutting edge 38a. This blade may have a depression 40a as shown, but the depression may be omitted. A guard 76 is formed on the end of shank 13a in much the same manner as guard 45 described above. The main difference is that the lower edge 77 of guard 76 is spaced outwardly a little from the level of inner surface 18a of the blade. This outward spacing of the guard edge makes it possible to omit depression 40 if the cutting tool is such that it does not require the depression.

In tool 10a, shield 69 is omitted, but another shield 80 is provided. This shield extends outwardly from shank 11a on the side of depression 40a remote from guard 76. In other words, this shield is spaced inwardly from the guard.

Tool 10a operates in substantially the same manner as tool 10. Wood particles and shavings cut from the article by edge 38a pass under the inner edge 77 of guard band 76. Shield 80 prevents particles from reaching the eyes of the operator. Guard 76 functions in the same manner as guard 45.

Figures 12 and 13 illustrate another alternative cutting tool in the form of a chisel. In this example, the shank and blade are combined as one in an elongated blade 84, said blade having a handle 85 at one end and a cutting edge 86 at its opposite end. This edge extends straight across the blade. A guard 87 in the form of a band 88 is connected to the blade and corresponds in shape transversely thereof to its cutting edge 86. This guard is located a little behind the cutting edge inwardly of the blade. An end of guard band 88 is connected by an arm or side 90 to a block 91 mounted on blade 84 in any convenient manner. In this example, a set screw 92 extends through the block and is threaded into the blade removably to hold the block in position. Band 88 and arm 90 form an opening 95 behind said band and opening outwardly laterally of the tool, as illustrated at 96. Although arm 90 may be located over the blade 84, it is preferable to offset it laterally a little so that it is clear of the blade, as clearly shown in Figure 12. The inner edge 98 of guard band 88 is spaced from the adjacent surface of blade 84 to provide a passage 99 therebetween.

Tool 83 functions substantially in the same manner as the above described tools. Guard 87 prevents cutting edge 86 from biting into the wood of the article being worked on. Particles cut from the article travel through passage 99 and into the opening 95 formed behind band 88. Shield 100 extends from the upper edge of the guard band over opening 95 to prevent particles from moving over the guard to the cutting edge and to prevent them from reaching the operator's eyes.

What I claim for my invention:

1. A wood turning cutting tool comprising an elongated shank, a blade having a cutting edge extending across an end thereof, said blade removably and adjustably mounted on said shank and positioned with said cutting edge overlapping one end of the shank, and a guard consisting of a band connected to said shank and spaced a little behind the cutting edge inwardly of the blade, said band having an outer surface facing away from the shank and corresponding in shape transversely of the blade to the cutting edge thereof and an inner edge spaced from the adjacent surface of the blade to form a passage therebetween, said inner edge of the guard band provided with notches adjacent the opposite ends of the blade cutting edge, said shank having an opening therein immediately behind said guard communicating with said passage, said passage and said opening forming a path for discharge of shavings severed from an article being worked with the tool, said notches in the inner edge of said guard band effective to aid the free flow of the shavings through said passage and out through said shank opening, said guard band being so positioned relative to the cutting edge that as the blade extends towards a surface of the article being worked, the guard band engages said surface to prevent the cutting edge from digging into the latter.

2. A wood turning cutting tool comprising an elongated shank, a blade overlapping the shank at one end thereof and projecting beyond said end, means connecting the blade to the shank, a cutting edge across the projecting end of the blade and a guard on the end of the shank spaced a little behind the cutting edge inwardly of the blade, said guard comprising of a band corresponding in shape transversely of the blade to the cutting edge, the lower edges of said band being notched adjacent opposite ends of the cutting edge, said shank having an opening therethrough immediately behind said guard band and the lower edge of said guard band being spaced from the adjacent surface of the blade to form a passage therebetween communicating with said shank opening, said passage and said shank opening providing a path through which pass shavings severed from an article being worked on with the tool, said notches adapted to facilitate movement of the said shavings through said passage and out through said shank opening away from the blade cutting edge, said guard band being so positioned relative to the cutting edge that as the blade extends towards the surface of an article being worked on with the tool, the guard engages said surface to prevent the cutting edge from digging into the latter.

3. A wood turning cutting tool comprising an elongated shank, a blade having a cutting edge extending across an end thereof, said blade removably and adjustably mounted on said shank and positioned within said cutting edge overlapping one edge of the shank, a guard consisting of a band corresponding in shape transversely of the blade to said cutting edge and extending outwardly from one end of said shank, the outer surface of said guard band spaced a little behind said cutting edge outwardly of the blade and an inner edge of said guard band spaced from the adjacent surface of the blade to form a passage therebetween, said shank formed with an opening therein immediately behind said guard band and communicating with said passage, and a shield connected to said guard band and extending rearwardly from said cutting edge over said shank opening and spaced outwardly therefrom, said passage and said shank opening providing means for directing shavings severed from an article being worked with the tool away from the cutting edge thereof, said guard being so positioned relative to the cutting edge that as the blade extends towards the surface of an article being worked on with the tool, the guard engages said surface to prevent the cutting edge from digging into the latter.

4. A wood turning cutting tool comprising an elongated shank, a blade having a cutting edge extending across an end thereof, said blade removably and adjustably mounted on said shank and positioned with said cutting edge overlapping one edge of the shank, a guard consisting of a band corresponding in shape transversely of the blade to said cutting edge and extending outwardly from one end of said shank, the outer surface of said guard band spaced a little behind said cutting edge outwardly of the blade and an inner edge of said guard band spaced from the adjacent surface of the blade to form a passage therebetween, a lower edge of said guard band being notched adjacent opposite ends of the cutting edge, said shank formed with an opening therein immediately behind said guard band and communicating with said passage, and a shield connected to said guard band and extending rearwardly from said cutting edge over said shank opening and spaced outwardly therefrom, said passage and said shank opening providing means for directing shavings severed from an article being worked with the tool away from the cutting edge thereof, said notches adapted to facilitate movement of said shavings through said passage and said shank opening, said guard band being so positioned relative to the cutting edge that as the blade extends towards the surface of an article being worked on with the tool, the guard engages said surface to prevent the cutting edge from digging into the latter.

References Cited in the file of this patent

UNITED STATES PATENTS

| 17,128 | Kilmer et al. | Apr. 21, 1857 |
| 296,501 | Albrecht | Apr. 8, 1884 |
| 327,312 | Reinhard et al. | Sept. 29, 1885 |

FOREIGN PATENTS

| 24,346 | Finland | Dec. 15, 1950 |